Figure 1:
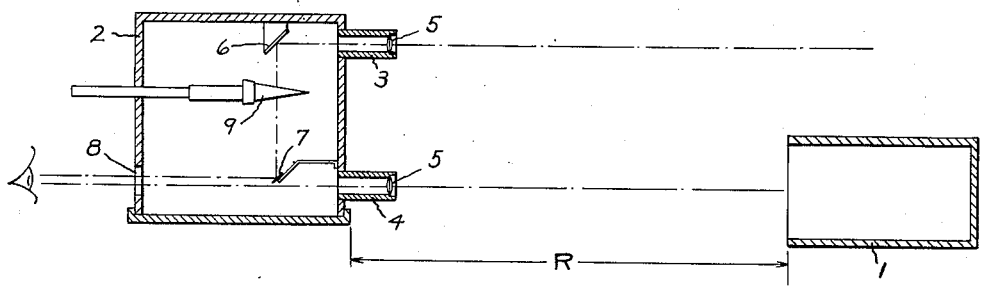

Dec. 8, 1953  S. Q. DUNTLEY  2,661,650
METHOD FOR MEASURING VISIBILITY
Filed March 17, 1949

Inventor
Seibert Q. Duntley
by Richard E. Hosley
His Attorney

Patented Dec. 8, 1953

2,661,650

UNITED STATES PATENT OFFICE 2,661,650

METHOD FOR MEASURING VISIBILITY

Seibert Q. Duntley, Cambridge, Mass., assignor to General Electric Company, a corporation of New York Application March 17, 1949, Serial No. 81,877

2 Claims. (Cl. 88—14)

My invention relates to visibility measurement systems and more particularly to methods and apparatus for measuring visibilty in terms of the atmospheric attenuation coefficient or the meteorological range.

Until comparatively recent times, the methods and apparatus employed to measure visibility have been unscientific and relatively inaccurate. In fact, in most parts of the world, the most common method of measuring visibility is for a trained observer to survey the surrounding countryside from a convenient vantage point and to approximate the actual visibility by reference to various landmarks. The accuracy of such a system depends wholly upon the judgment and perceptive ability of the observer. Where there are no suitable landmarks, such as at sea, it is virtually impossible to estimate visibility with any degree of accuracy. The visibility data obtained by this method is obviously unsuited for scientific calculations.

The recent development of the art of camouflage as well as the increased emphasis upon air and sea transportation has made it apparent that a more scientifically accurate determination of visibility is necessary. Because of the subjective criteria inherent in the term "visibility," a more objective standard of visibility in terms of the "meteorological range" has commonly been substituted in scientific discussions. Meteorological range is defined as that horizontal distance through an optically homogeneous atmosphere for which the contrast transmittance of the atmosphere, i. e., the ratio of the apparent contrast of an object viewed against the sky to its inherent contrast, is equal to 2%. This term lends itself to mathematical analysis and permits visibility data to be correlated in terms of a common objective standard. Visibility is also sometimes expressed in terms of the atmospheric attenuation, and determined by reference to relative atmospheric attenuation coefficients. A simple relation, as will be fully explained hereinafter, exists between the meteorological range and the atmospheric attenuation coefficient enabling visibility to be easily expressed in terms of either.

The difficulties inherent in the scientific measurement of visibility have also been aggravated by the lack of a proper scientific analysis of the precise phenomena which cause a reduction of visibility. As explained in my recent paper entitled "The reduction of apparent contrast by the atmosphere," published in the Journal of the Optical Society of America, vol. 38, No. 2, pages 179 to 191 in February 1948, the reduction of visibility imposed by the atmosphere is caused both by the scattering of light in all directions and by the absorption of light by minute particles suspended in the air. Most instruments which have heretofore been employed to measure visibility have measured only the light that is scattered by the atmosphere in a particular direction and have neglected properly to account for both the absorption of light and the possibility that the light may be unequally scattered in different directions with the result that such instruments are unreliable when employed in a smoky or dusty area such as is commonly to be found near a city.

A principal object of my invention, therefore, is to present a new method by which visibility, in terms of the meteorological range or the atmospheric attenuation coefficient, can be measured with considerable accuracy.

An additional object of my invention is to provide simple and convenient apparatus for measuring visibility in accordance with the above-mentioned new method.

A further specific object of my invention is to provide a new method and apparatus for measuring visibility which accurately measures the reduction of visibility resulting both from the scattering of light and from the absorption of light by the atmosphere.

In general, my new method of measuring visibility comprehends the comparison, along substantially the same line of sight, of the luminance of the horizon sky with the apparent luminance of an object having substantially zero inherent luminance. A preferred embodiment of the apparatus which I provide to accomplish this comparison includes a sighting device having a pair of sighting apertures, one of which is trained upon a horizontal hollow member having black interior surfaces and the other of which is directed toward the horizon sky beyond this hollow member. Means are provided whereby the transmitted horizon luminance is attenuated until it is perceived by a human observer to reach the same level as the apparent transmitted luminance of the hollow member. The luminance attenuating means may then be calibrated to indicate visibility. In a modification of my invention, a pair of photoelectric cells which receive the transmitted horizon luminance and hollow member luminance respectively are connected into a bridge circuit which measures the resultant ratio of the respective currents produced by the photoelectric cells.

Figure 2:
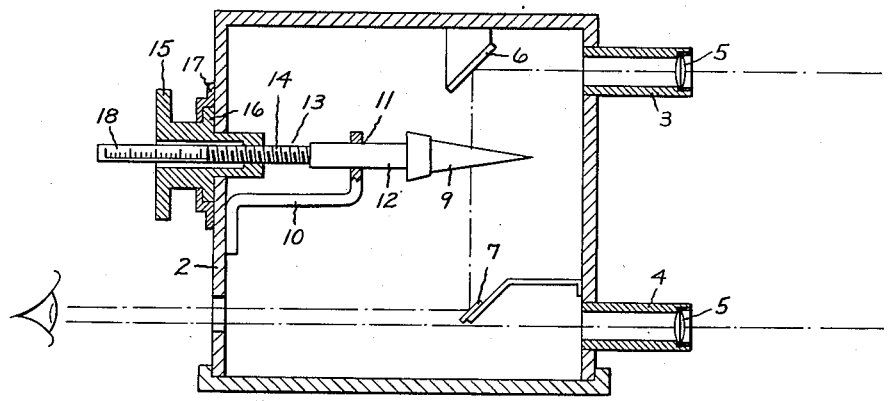
Figure 3:
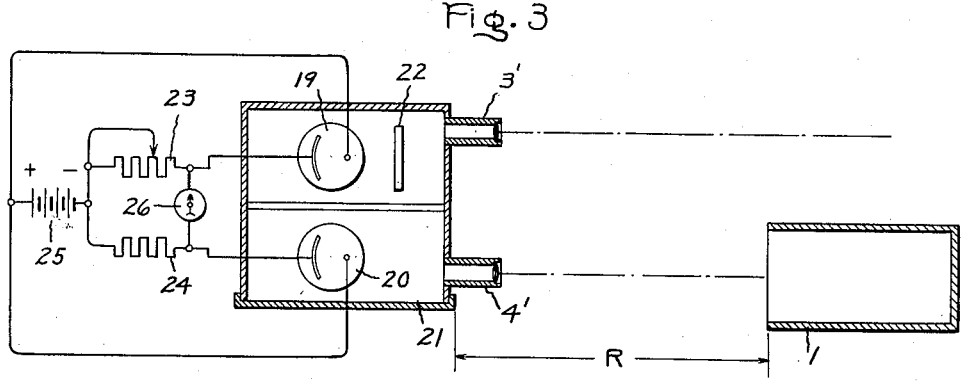

The novel features which I believe to be characteristic of my invention are set forth with particularity in the appended claims. My invention itself, however, together with further objects and advantages thereof can best be understood by reference to the following description taken in connection with the accompanying drawing in which Fig. 1 is a diagrammatic view of one embodiment of my invention, Fig. 2 is an enlarged sectional view illustrating a preferred mechanical construction of the sighting device of Fig. 1, and Fig. 3 is a diagrammatic view of a modification of my invention wherein photoelectric cells are substituted for the eye of an observer to permit more accurate comparison of relative luminance.

As explained by my above-mentioned paper entitled "The reduction of apparent contrast by the atmosphere," I have found that the luminance of the horizon sky $B_H$ in the direction of an object is related to the optical constants of the atmosphere by the formula:

$$B_H = \frac{t_0 q}{\beta_0} \qquad (1)$$

where $q$ is the spectral radiant density of the space light at a particular point along the line of sight, $t_0$ is the scattering-rate coefficient of the back-scattered light, and $\beta_0$ is the atmospheric attenuation coefficient. As is evident from the nature of the optical constants employed in this formula, the effects of both the scattered light and the light absorbed by the atmosphere are taken into consideration in the derivation thereof.

The apparent luminance of an object $B_R$ as seen from a distance R is also shown in the above-mentioned paper to be equal to the relation:

$$B_R = \frac{t_0 q}{\beta_0}\left(1 - e^{-\beta_0 R}\right) + B_0 e^{-\beta_0 R} \qquad (2)$$

where $B_0$ is the inherent luminance of the object.

If an object is chosen having zero inherent luminance, $B_0$ equals zero, then the second term of Expression 2 disappears; and by combining Equations 1 and 2 the following relation results:

$$B_R = B_H(1 - e^{-\beta_0 R}) \qquad (3)$$

The meteorological range $v$, as explained previously, is defined in the art as that horizontal distance for which the contrast transmittance, i. e., the ratio of the apparent contrast of an object viewed against the sky to its inherent contrast, is equal to 2%. The meteorological range $v$ may also be expressed in terms of the attenuation coefficient $\beta_0$ by the relation:

$$v = \frac{3.912}{\beta_0} \qquad (5)$$

and $$\beta_0 = \frac{3.912}{v} \qquad (6)$$

substituting Equation 6 in Equation 3 we obtain:

$$B_R = B_H\left(1 - e^{-3.912\frac{R}{v}}\right) \qquad (7)$$

This may be written in series form as follows:

$$B_R = B_H\left(1 - \left[1 - 3.912\frac{R}{v} + 3.912^2\frac{R^2}{v^2} \cdots\right]\right) \qquad (8)$$

If the ratio of R to $v$ is very small, the Equation 8 reduces to:

$$B_R = B_H\left(3.912\frac{R}{v}\right) \qquad (9)$$

$$v = \frac{B_H}{B_R}(3.912 R) \qquad (10)$$

$$\beta_0 = \frac{B_R}{B_H} = \left(\frac{1}{R}\right) \qquad (11)$$

Therefore, if we place an object having zero inherent luminance a distance R away from an observer, and that distance R is very small in comparison to the meteorological range $v$, it follows that the meteorological range itself or the atmospheric attenuation coefficient $\beta_0$, may be determined by comparing the luminance of the horizon sky $B_H$ with the apparent luminance of the object $B_R$ as viewed by an observer along a common line of sight.

Furthermore, if we make the distance R equal to a value which, when multiplied by 3.912, yields a whole number, we obtain a relation which permits an extremely simple conversion of the above luminance ratio into meteorological range. If, for example, the object is placed 1.02 yards from the observer then:

$$v = 4\frac{B_H}{B_R} \qquad (11)$$

Referring to Fig. 1, I have illustrated one embodiment of my invention constructed in keeping with the foregoing discussion to accomplish the measurement of meteorological range. An object having zero inherent luminance such as a hollow member 1, open at one end and having black interior surfaces, is horizontally placed a known distance R away from a sighting device 2. The distance R must be very small in comparison to the meteorological range. Since the meteorological range is usually greater than 400 yards, any distance less than 4 yards gives a ratio smaller than 1% and will yield sufficiently accurate readings. The object 1 is also preferably placed at a distance R which, when multiplied by 3.912, gives a whole number. Distances such as 1.02, 1.27, 1.54, 2.04, 2.54, and 3.08 yards fulfill the above conditions.

The sighting device 2 may be in the form of a box as illustrated including a pair of parallel sighting members such as projecting tubes 3 and 4 which may contain proper focusing lenses 5. One of the sighting members, such as sighting tube 4, is trained upon the black box 1 while the other sighting member 3 is trained upon the horizon sky beyond the black box but along substantially the same line of sight. It is evident, of course, that both the hollow member 1 and the sighting device 2 must be horizontally mounted from a position and in a direction which permits an unobstructed view of the horizon.

A mirror 6 is arranged within sighting device 2 to receive the light transmitted from the horizon through sighting tube 3 and to reflect this horizon luminance upon a second mirror 7 which, in turn, is arranged to reflect this horizon luminance through an observer's aperture 8 in the rear of the device 2. The apparent luminance of the black hollow member 1, transmitted through sighting tube 4 is also propagated through this observer's aperture 8 as illustrated.

In order to attenuate the horizon luminance and thereby to permit a comparison with the apparent luminance of object 1, a variable light density filter 9 which preferably is in the form of a wedge, is arranged adjustably to intercept the horizon light reflected from mirror 6 to mirror 7. Attenuation of this horizon light, as viewed by an observer A is accomplished by moving the variable filter 9 through the light path so that the light rays intercept progressively thicker cross-sections of the filter 9.

One convenient means of achieving the adjustability of filter 9 is illustrated in Fig. 2. A supporting bracket 10 has a noncircular aperture 11 through which a conforming noncircular portion 12 of a shaft 13 secured to filter 9 is slidably inserted. A circular portion 14 of shaft 13 rearwardly extending from portion 12 thereof is threaded within a nut 15 externally rotatable in a fixed position by virtue of an annular shoulder 16 of the nut 15 which is held within an annular collar 17 secured to the sighting device 2. When nut 15 is rotated, it imparts a lateral movement to shaft 13 which thrusts the filter 9 either in or out of the light path depending upon the direction of rotation. An externally extending portion 18 of shaft 13 may be ruled to indicate the position of the filter 9.

In the operation of my invention, an observer merely adjusts the position of the filter 9 by turning nut 15 until the luminance of the horizon sky as reflected from mirror 7 is equal to the luminance of the black hollow member 1 as seen through the sighting tube 4. The position of the filter 9, as indicated by the ruled markings on shaft portion 18, may be calibrated in terms of either the attenuation coefficient or the meteorological range with a given object distance R.

Referring to Fig. 3, I have shown a modification of my invention whereby the luminance comparison is accomplished by a pair of photoelectric cells rather than the eye of an observer. A pair of photoelectric cells 19 and 20 are arranged within a sighting device 21 to receive the light transmitted through the sighting tubes 3' and 4' respectively. A neutral light filter 22, preferably having an optical density of 2, i. e., a transmittance of 1%, is located to intercept the light transmitted from the horizon to the photoelectric cell 19 and thereby attenuates the horizon luminance by a factor of 100.

The photoelectric cells 19 and 20 are connected as adjacent arms of a conventional bridge network to a variable resistor 23 and a fixed resistor 24 respectively. Battery 25 is connected as the source of bridge power. A conventional voltmeter 26, preferably of the type having zero in the center of the scale, is connected across the bridge network.

In operation, it is only necessary to adjust the value of the variable resistor 23 until the meter 26 indicates zero. The position of the movable arm of the variable resistor 23 can then be calibrated in terms of the attenuation coefficient or the meteorological range for a given object distance R. It will be apparent to those skilled in the art that a self-balancing recording potentiometer may alternatively be substituted for the combination of variable resistor 23 and meter 26.

It is to be understood that although I have shown particular embodiments of my invention, many other modifications may be made and I therefore intend by the appended claims to cover all such modifications as fall within the true spirit and scope of my invention.

What I claim as new and desire to secure by Letters Patent of the United States is:

1. A method of measuring range of visibility comprising positioning an object having a black background target portion of zero luminance in the atmosphere a known distance from a luminance comparison device, said distance being less than four yards; directing the horizon luminance and the apparent luminance from the direction of said black object into two juxtaposed positions in said comparison device, said apparent luminance being due solely to the diffusion of light by the atmosphere between said black object and said comparison device; filtering the intensity of the horizon luminance by means of a calibrated wedge until the two intensities appear equal, the amount of filtering used giving a true indication of the difference between the horizon luminance and the apparent luminance caused by the atmospheric diffusion property of the atmosphere between the black object and the comparison device; and obtaining an index of visibility by determining the amount of filtering necessary to equalize the luminance intensities.

2. The method of claim 1 wherein the distance between the object and the luminance measuring device is less than 4 yards and is of a magnitude which, when multiplied by the factor 3.912, yields a whole number.

SEIBERT Q. DUNTLEY.

References Cited in the file of this patent

UNITED STATES PATENTS

| Number | Name | Date |
|---|---|---|
| 2,154,374 | Byram | Apr. 11, 1939 |
| 2,198,971 | Neufeld | Apr. 30, 1940 |
| 2,250,333 | Miller | July 22, 1941 |
| 2,342,061 | Rath | Feb. 15, 1944 |
| 2,450,761 | MacNeille | Oct. 5, 1948 |

OTHER REFERENCES

J. O. S. A., article by Evans, "Photometer for Measurements of Sky Brightness Near the Sun," vol. 38, No. 12, December 1948, pages 1083 to 1085.

Monthly Notices of Royal Astronomical Society, article by Lyot, "A Study of Solar Corona," vol. 99, No. 8, June 1939, pages 580 to 586. Copy of pages 580 to 586 in 88–23 (G).